(12) United States Patent
Lucas et al.

(10) Patent No.: US 7,781,513 B2
(45) Date of Patent: Aug. 24, 2010

(54) TWO-PART MOISTURE-CURABLE RESIN COMPOSITION AND ADHESIVE, SEALANT AND COATING COMPOSITIONS BASED THEREON

(75) Inventors: Gary M. Lucas, Glenville, NY (US); Patrice J. Lehmann, Vetraz-Monthoux (FR)

(73) Assignee: Momentive Performance Materials Inc., Albany, NY (US)

( * ) Notice: Subject to any disclaimer, the term of this patent is extended or adjusted under 35 U.S.C. 154(b) by 158 days.

(21) Appl. No.: 11/985,098

(22) Filed: Nov. 14, 2007

(65) Prior Publication Data

US 2009/0124751 A1 May 14, 2009

(51) Int. Cl.
*C08L 75/04* (2006.01)
*C08L 9/00* (2006.01)
*C08L 71/00* (2006.01)
*C08L 67/00* (2006.01)

(52) U.S. Cl. .................. 524/507; 524/543; 524/588; 524/589; 524/525; 524/612

(58) Field of Classification Search .................. 524/507
See application file for complete search history.

(56) References Cited

U.S. PATENT DOCUMENTS

| | | | | |
|---|---|---|---|---|
| 3,839,246 | A | | 10/1974 | Hamilton, Jr. et al. |
| 3,956,209 | A | | 5/1976 | Hamilton, Jr. et al. |
| 4,625,012 | A | * | 11/1986 | Rizk et al. .................. 528/28 |
| 5,346,939 | A | * | 9/1994 | Moren et al. ................ 524/176 |
| 5,464,888 | A | * | 11/1995 | Owen .......................... 524/104 |
| 5,519,104 | A | * | 5/1996 | Lucas .......................... 528/18 |
| 5,614,604 | A | * | 3/1997 | Krafcik ........................ 528/28 |
| 5,894,071 | A | | 4/1999 | Merz et al. |
| 6,025,416 | A | * | 2/2000 | Proebster et al. ............. 523/333 |
| 6,451,440 | B2 | * | 9/2002 | Atwood et al. ............... 428/448 |
| 6,664,323 | B2 | * | 12/2003 | Lucas .......................... 524/474 |
| 6,703,442 | B1 | * | 3/2004 | Ando et al. .................. 524/588 |
| 6,790,903 | B1 | * | 9/2004 | Majolo et al. ................ 524/506 |
| 6,828,403 | B2 | * | 12/2004 | Mahdi et al. ................... 528/18 |
| 7,189,781 | B2 | * | 3/2007 | Acevedo et al. .............. 524/588 |
| 7,223,821 | B2 | | 5/2007 | Okuhira et al. |
| 2005/0137322 | A1 | * | 6/2005 | Roesler et al. ............... 524/589 |
| 2005/0137324 | A1 | * | 6/2005 | Roesler et al. ............... 524/589 |
| 2005/0192387 | A1 | * | 9/2005 | Williams et al. ............. 524/261 |
| 2007/0088110 | A1 | | 4/2007 | Kohl et al. |
| 2007/0088137 | A1 | | 4/2007 | Georgeau et al. |
| 2007/0178257 | A1 | * | 8/2007 | Landon ........................ 428/34 |
| 2007/0179242 | A1 | * | 8/2007 | Landon ........................ 524/588 |
| 2007/0244249 | A1 | * | 10/2007 | Correia ........................ 524/588 |

FOREIGN PATENT DOCUMENTS

EP 1 544 225 A1 6/2005

* cited by examiner

*Primary Examiner*—Randy Gulakowski
*Assistant Examiner*—Robert Loewe
(74) *Attorney, Agent, or Firm*—Dominick G. Vicari; Joseph S. Ostroff

(57) ABSTRACT

This invention relates to moisture-curable resins generally and, more particularly, to two-part moisture-curable resin compositions the first part of which contains a moisture-curable silylated resin and the second part of which contains water. The invention further relates to adhesive, sealant and coating compositions based on such two-part moisture-curable resin compositions.

15 Claims, No Drawings

TWO-PART MOISTURE-CURABLE RESIN COMPOSITION AND ADHESIVE, SEALANT AND COATING COMPOSITIONS BASED THEREON

BACKGROUND OF THE INVENTION

Adhesives are commonly used to join or fasten two or more materials or adherents including wood, metals, plastics, ceramics, stone, glass, concrete, etc. Adhesives used for these purposes are based on a wide range of technologies including solvent/resin mixtures, epoxies, latexes, polyurethanes, silicones, cyanoacrylates, acrylics, hot melts and others. Such adhesives can have one or more drawbacks, such as high volatile organic compound (VOC) content, flammability, incompatibility with one or more classes of adherents, undesirably long cure times, insufficient bond strength and short shelf lives. A variety of moisture-curable, silane-functional resins have been developed to address many of these deficiencies. Silane-functional adhesives systems are typically cured in a two-step sequence in which water, either as water vapor or liquid water, reacts with, i.e., hydrolyzes, an alkoxysilane group to form a silanol group followed by reaction, or condensation, of the silanol group with the silanol group of another similarly hydrolyzed alkoxysilane molecule resulting in the formation of numerous crosslinks. In one-component silicone adhesive formulations, catalysts are typically employed to increase the rate of the hydrolysis reactions. In many cases, the absorption and/or permeation of water or water vapor is a rate-limiting step in the curing or crosslinking process.

Moisture-curable resin compositions are well known for their use as sealants and adhesives. Such compositions typically require a considerable amount of time, commonly several days, in which to fully cure before reaching maximum strength. In certain applications that utilize sealants and adhesives in assembly line applications (e.g., in window assembly), it is desirable to use a sealant or adhesive that can rapidly develop green strength. It is also highly desirable that the moisture-curable resin compositions exhibit long shelf (storage) life prior to their application.

SUMMARY OF THE INVENTION

In accordance with the present invention, a two-part moisture-curable resin composition is provided which comprises:

a) a first part substantially free of moisture comprising:
   (1) moisture-curable silylated resin and,
   (2) optionally, one or more additional components selected from the group consisting of plasticizer, solvent, thixotropic agent, particulate material, moisture scavenger, isocyanate scavenger, crosslinker, adhesion promoter, U.V. stabilizer and antioxidant; and, b) a second part comprising:
   (1) water in an amount sufficient to cure moisture-curable silylated resin (a)(1);
   (2) at least one plasticizer and/or particulate material,
   (3) nonionic surfactant in an amount sufficient to provide a stable emulsion of plasticizer (b)(2), if present, and a stable suspension of particulate material (b)(2), if present,
   (4) optionally, one or more additional components selected from the group consisting of solvent, thixotropic agent, pH adjuster, U.V. stabilizer and antioxidant, provided, the first part and/or the second part further comprises catalyst (c) for the condensation reaction of hydrolyzed moisture-curable silylated resin (a)(1).

The foregoing two-part moisture-curable resin composition is highly stable for as long as its first part containing moisture-curable silylated resin (a)(1) remains substantially moisture-free. Once the two parts of the composition are mixed together, silylated resin (a)(1) rapidly undergoes hydrolysis and subsequent catalyzed condensation to provide a crosslinked resin that quickly develops in green strength.

The two-part moisture-curable resin composition of the invention allows the end-user to handle, package and ship an assembled construction, e.g., a window assembly, after shorter cure times without deleterious effect to the assembled construction, thus increasing production line speed and lowering product inventory. A further advantage to the end user is the excellent shelf stability of the composition of the present invention which allows for the storage of the compositions for relatively prolonged periods of time, e.g., up to 18 months, prior to application without reduced performance.

The two-part moisture-curable resin composition herein is especially suitable for use as an adhesive and/or sealant for industrial assembly and specifically for glazing applications of window assemblies such as insulated glass units (IGUs).

The expression "green strength" as used herein refers to a sealant, adhesive, and/or coating that develops sufficient elastomeric strength and substrate adhesion such that elements of a construction can be formed and will maintain the desired configuration even if handled, packaged, and shipped after relatively short times, without permanent deformation.

The terms "stable" and "stability" as applied to the two-part moisture-curable resin composition of the invention shall be understood to mean that in the packaged state, at ambient temperature and over its expected shelf life, neither of the two parts will undergo any significant degree of chemical change, e.g., in the case of the first part, there will be no appreciable gelation of its silylated resin component (a)(1) and/or increase in the viscosity of this part, or any appreciable change in the physical uniformity of the components making up a part, e.g., in the case of the second part, there will be no discernible separation of plasticizer (b)(2) and/or optional component(s) (b)(3) from water (b)(1).

The expressions "polyether polyol," polyester polyol," "hydroxyl-terminated polybutadiene," "polyurethane-polyurea" and "polyurea" include resins of these types in which an average of less than half their weight is derived from one or more copolymerizable monomers other than the general types of monomers for which the resins are named. Thus, e.g., a polyether polyol in which on average less than half its weight is made up of copolymerized ester units shall still be considered a polyether polyol and, similarly, a polyester polyol in which an average of less than half its weight is made up of copolymerized ether (alkyleneoxy) units shall still be considered a polyester polyol.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

DETAILED DESCRIPTION OF THE INVENTION

I. The First Part of the Two-Part Moisture-Curable Resin Composition

Moisture-Curable Silylated Resin (a)(1)

The first part of the two-part moisture-curable resin composition herein contains a moisture-curable silylated resin (a)(1) that on exposure to moisture undergoes hydrolysis and subsequent condensation to provide a resin having properties which, depending on the specific formulation of the composition, make it useful for such applications as adhesives, sealants and coatings.

The precursor resin from which silylated resin (a)(1) is derived can be any of those heretofore known for use in the manufacture of moisture-curable silylated resins. Suitable resins include polyether polyols (i), polyester polyols (ii), hydroxyl-terminated polybutadienes (iii), hydroxyl-terminated and isocyanate-terminated polyurethane prepolymers (iv) derived from any of the foregoing, isocyanate-terminated and amine-terminated polyurethane-polyurea (poly(urethane-urea) or polyurethaneurea) prepolymers and polyurea prepolymers (v) derived from polyamines, and olefinically unsaturated polymers (vi) that are capable of undergoing hydrosilation with hydridrosilanes, e.g., polyolefins and polyethers possessing terminal olefinic unsaturation. Silylated resin (a)(1) can be obtained by silylating these and similar precursor resins in any known or conventional manner, e.g., a hydroxyl-terminated resin can be silylated by reaction with an isocyanatosilane, an isocyanate-terminated resin can be silylated with a silane possessing functionality that is reactive for isocyanate such as mercapto or amino functionality, and an olefinically unsaturated resin can be silylated by reaction with a hydridosilane (hydrosilane) under hydrosilation reaction conditions.

Some particularly useful silylated resins (a)(1) and their preparation will now be more fully described.

1. Moisture-Curable Silylated Resins Obtained Directly from Polyols

Moisture-curable silylated resins (iv) can be obtained by the direct silylation of polyols, e.g., any of the polyether polyols (i), polyester polyols (ii) and hydroxyl-terminated polybutadienes (iii) previously mentioned, as well as other hydroxyl-terminated olefin polymers, with isocyanatosilane. Preparation of these silylated polyols can be carried out substantially as described below for moisture-curable silylated resins obtained from the reaction of hydroxyl-terminated polyurethane prepolymers with isocyanatosilanes.

2. Moisture-Curable Silylated Polyurethane Resin (SPUR) Obtained from Isocyanate-Terminated Polyurethane (PUR) Prepolymer Derived from Polyether or Polyester Polyols Isocyanate-terminated polyurethane (PUR) prepolymers can be obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate is employed.

Included among the polyols that can be utilized for the preparation of the isocyanate-terminated PUR prepolymer are polyether polyols, polyester polyols such as the hydroxyl-terminated polycaprolactones, polyetherester polyols such as those obtained from the reaction of polyether polyol with e-caprolactone and polyesterether polyols such as those obtained from the reaction of hydroxyl-terminated polycaprolactones with one or more alkylene oxides such as ethylene oxide and propylene oxide.

Specific suitable polyols include the poly(oxyalkylene) ether diols (i.e., polyether diols), in particular, the poly(oxyethylene)ether diols, the poly(oxypropylene)ether diols and the poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, polybutadiene diols, and the like. In one embodiment of the present invention, the polyols used in the production of the isocyanate-terminated PU prepolymers are poly(oxyethylene)ether diols with number average molecular weights (Mn) between about 500 g/mol and 25,000 g/mol. In another embodiment of the present invention, the polyols used in the production of the isocyanate-terminated PUR prepolymers are poly(oxypropylene)ether diols with equivalent weights between about 1,000 g/mol to 20,000 g/mol. Mixtures of polyols of various structures, molecular weights and/or functionalities can also be used.

The polyether polyols can have a functionality up to about 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of which are incorporated here by reference. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of from about 1,000 g/mol to about 25,000 g/mol, more preferably from about 2,000 g/mol to about 20,000 g/mol, and even more preferably from about 4,000 g/mol to about 18,000 g/mol. Examples of commercially available diols that are suitable for making the isocyanate-terminated PUR prepolymer include, but are not limited to, ARCOL R-1819 (number average molecular weight of 8,000 g/mol), E-2204 (number average molecular weight of 4,000 g/mol), and ARCOL E-2211 (number average molecular weight of 11,000 g/mol).

Any of numerous polyisocyanates, advantageously, diisocyanates, and mixtures thereof, can be used to provide the isocyanate-terminated PUR prepolymers. In one embodiment, the polyisocyanate can be diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, isophorone diisocyanate ("IPDI"), dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated PUR prepolymers described above must contain functionality that is reactive with isocyanate and at least one readily hydrolyzable and subsequently crosslinkable group, e.g., alkoxy. Particularly useful silylation reactants are the silanes of the general formula:

wherein X is an active hydrogen-containing group that is reactive for isocyanate, e.g., —SH or —NHR$^4$ in which R$^4$ is H, a monovalent hydrocarbon group of up to 8 carbon atoms or —R$^5$—Si(R$^6$)$_y$(OR$^7$)$_{3-y}$, R$^1$ and R$^5$ each is the same or different divalent hydrocarbon group of up to 12 carbon atoms, optionally containing one or more heteroatoms, each R$^2$ and R$^6$ is the same or different monovalent hydrocarbon group of up to 8 carbon atoms, each R$^3$ and R$^7$ is the same or different alkyl group of up to 6 carbon atoms and x and y each, independently, is 0, 1 or 2.

Specific silanes for use herein include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxy-silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

A catalyst will ordinarily be used in the preparation of the isocyanate-terminated PUR prepolymers. Advantageously, condensation catalysts are employed since these will also catalyze the cure (hydrolysis followed by crosslinking) of the PUR resin component of the curable compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium-containing and bismuth-containing complexes such as KAT XC6212, K-KAT XC-A209 and K-KAT 348, supplied by King Industries, Inc., titanium chelates such as the TYZOR® types, available from DuPont company, and the KR types, available from Kenrich Petrochemical, Inc., and other organometallic catalysts, e.g., those containing a metal such as Al, Zn, Co, Ni, Fe, and the like.

3. Moisture-Curable SPUR Resin Obtained from Hydroxyl-Terminated PUR Prepolymers Derived from Polyether or Polyester Polyols Moisture-curable SPUR resin (a)(1) can be obtained by reacting a hydroxyl-terminated PUR prepolymer with an isocyanatosilane. The hydroxyl-terminated PUR prepolymer can be obtained in substantially the same manner employing substantially the same materials, i.e., polyols, polyisocyanates and optional catalysts (preferably condensation catalysts), described above for the preparation of isocyanate-terminated PUR prepolymers the one major difference being that the proportions of polyol and polyisocyanate will be such as to result in hydroxyl-termination in the resulting prepolymer. Thus, e.g., in the case of a diol and a diisocyanate, a molar excess of the former will be used thereby resulting in hydroxyl-terminated PUR prepolymer.

Useful silylation reactants for the hydroxyl-terminated PUR prepolymers are those containing isocyanate termination and readily hydrolyzable functionality, e.g., from 1 to 3 alkoxy groups. Suitable silylating reactants are the isocyanatosilanes of the general formula:

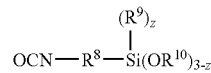

wherein R$^8$ is an alkylene group of up to 12 carbon atoms, optionally containing one or more heteroatoms, each R$^9$ is the same or different alkyl or aryl group of up to 8 carbon atoms, each R$^{10}$ is the same or different alkyl group of up to 6 carbon atoms and z is 0, 1 or 2. In one embodiment, R$^8$ possesses 1 to 4 carbon atoms, each R$^{10}$ is the same or different methyl, ethyl, propyl or isopropyl group and z is 0.

Specific isocyanatosilanes that can be used herein to react with the foregoing hydroxyl-terminated PUR prepolymers to provide moisture-curable SPUR resins include isocyanatopropyltrimethoxysilane, isocyanatoisopropyl trimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, and the like.

4. Moisture-Curable SPUR Resin Obtained from Isocyanate-Terminated or Hydroxyl-Terminated PUR Prepolymer Derived from Hydroxyl-Terminated Polybutadiene Moisture-curable SPUR resin (a)(1) can be derived from hydroxyl-terminated polybutadiene, understood herein to include any hydroxyl-terminated polymer in which at least about 50 weight percent of the polymer is made up of units derived from butadiene.

In one embodiment, the moisture-curable SPUR resin is obtained by silylation of polybutadiene-based PUR prepolymer possessing isocyanate termination with a silane possessing at least one hydrolyzable group and functionality which is reactive for isocyanate, e.g., a secondary aminoalkyltrialkoxysilane and in another embodiment, by silylation of a polybutadiene-based PUR prepolymer possessing hydroxyl termination with an isocyanatosilane possessing at least one hydrolyzable group.

Polybutadiene-based PUR prepolymer is obtained by reacting one or more hydroxyl-terminated, optionally hydrogenated, linear or branched polybutadiene homopolymers or copolymers with an organic polyisocyanate, e.g., an organic diisocyanate, optionally together with one or more other difunctional compounds and/or hydroxyl-terminated polymers, to provide an isocyanate-terminated polyurethane prepolymer when the total equivalents of isocyanate functionality exceeds the total equivalents of hydroxyl functionality, and a hydroxyl-terminated polyurethane prepolymer when the total equivalents of hydroxyl functionality exceeds the total equivalents of isocyanate functionality.

Among the hydroxyl-terminated polybutadienes that are useful for preparing the isocyanate-terminated and hydroxyl-terminated polyurethane prepolymers are those possessing a number average molecular weight (Mn) of from about 500 g/mol to about 10,000 g/mol, and advantageously from about 800 g/mol to about 5,000 g/mol, a primary hydroxyl group content of from about 0.1 to about 6.0 meq/g, and advantageously from about 0.3 to about 1.8 meq/g, a degree of hydrogenation of from 0 up to 100 percent of the olefinic sites present and an average content of copolymerized additional monomer(s) of from 0 up to about 50 weight percent.

Hydroxyl-terminated butadienes of the above-described type, averaging more than one predominantly primary hydroxyl group per molecule, e.g., averaging from about 1.7 to about 3 or more primary hydroxyl groups per molecule, are suitably employed herein. The hydroxyl-terminated polybutadienes will possess an average of at least about 2, and advantageously from about 2.4 up to about 2.8, hydroxyl groups per molecule, the hydroxyl groups being predominantly in terminal allylic positions on the main, i.e., generally longest, hydrocarbon chain of the molecule. By "allylic" configuration is meant that the alpha-allylic grouping of allylic alcohol, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the butadiene polymers employed in this invention, the number and location of the hydroxyl groups and the molecular weight of the butadiene polymers will be influenced by the process employed for their manufacture, the details of which are known in the art.

Hydroxyl-terminated polybutadienes possessing these characteristics are commercially available from several sources and are therefore conveniently employed herein.

The useful hydroxyl-terminated polybutadienes herein can also incorporate one or more other copolymerizable monomers which can confer particularly desirable properties upon the silylated polymers herein and the pressure sensitive adhesive compositions prepared therewith. The total amount of copolymerized monomer will not exceed, on average, 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Isocyanate-terminated PUR prepolymers are prepared by reacting an excess of organic polyisocyanate with one or more of the foregoing hydroxyl-terminated polybutadiene homopolymers and or copolymers, generally, in the presence of a catalyst. As used herein, the term "polyisocyanate" means an organic compound possessing two or more isocyanate groups. The reaction temperature is typically in the range of from about 60° to about 90° C.; the reaction time is typically from about 4 to about 8 hours.

In addition to the hydroxyl-terminated butadiene-based polymer, the reaction mixture can contain one or more chain extenders and/or one or more other polyols. Examples of suitable chain extenders are polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetraethylene glycol, dipropylene glycol, tripropylene glycol, tetrapropylene glycol and the like. Additional polyols include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

Suitable organic polyisocyanates include any of the known and conventional organic polyisocyanates, especially organic diisocyanates, from which polyurethane polymers have heretofore been prepared. Useful diisocyanates include, for example, 2,4-toluene diisocyanate, 2,6-toluene diisocyanate, 4,4' diphenyl-methanediisocyanate, isophorone diisocyanate, dicyclohexylmethane-4,4'-diisocyanate, various liquid diphenylmethane-diisocyanates containing a mixture of 2,4- and 4,4' isomers, Desmodur N® (Bayer) and the like, and mixtures thereof. Isophorone diisocyanate is especially advantageous for use in preparing the polyurethane prepolymers herein.

Suitable catalysts useful in the preparation of the PUR prepolymers are dialkyltin dicarboxylates such as dibutyltin dilaurate and dibutyltin acetate, tertiary amines, the stannous salts of carboxylic acids such as stannous octoate and stannous acetate, and the like.

To prepare isocyanate-terminated PUR prepolymers, at least a slight mole excess of the isocyanate equivalents (NCO groups) with respect to the hydroxyl equivalents (OH groups) is employed to terminate the polybutadiene homopolymer(s) and/or copolymer(s) with isocyanate groups. Advantageously, the molar ratio of NCO to OH is from about 1.1 to about 4.0 depending on the selection of the particular hydroxyl-terminated polybutadiene homopolymer(s) and/or copolymer(s), optional chain extenders and optional non-butadiene based polyols.

Hydroxyl-terminated PUR can be prepared by the reaction of an organic polyisocyanate, e.g., a diisocyanate such as any of those mentioned above, and advantageously isophorone diisocyanate, with a stoichiometric excess of the selected hydroxyl-terminated polybutadiene homopolymer(s) and/or copolymer(s). Depending on the reactivity of the respective reactants, a catalyst such as any of those mentioned above can be employed. The reaction temperature is typically in the range of from about 600 to about 90° C.; the reaction time is typically on the order of from about 2 to about 8 hours. The reaction mixture can also contain one or more chain extenders and/or other polyols such as any of those mentioned above.

To prepare the hydroxyl group-terminated PUR prepolymers, at least a slight molar excess of the hydroxyl equivalents (OH groups) with respect to the NCO isocyanate equivalents (NCO groups) is employed to terminate the polybutadiene chains with hydroxyl groups. Advantageously, the molar ratio of NCO to OH is from about 0.3 to about 0.95, and more preferably from about 0.5 to about 0.90, depending on the specific hydroxyl-terminated polybutadiene employed.

Silylation of isocyanate-terminated PUR prepolymer can be accomplished by reacting the prepolymer with a silane possessing at least one hydrolyzable group and at least one functionality which is reactive for isocyanate, i.e., an active hydrogen-containing group such as hydroxyl, carboxylic acid, mercapto, primary amino or secondary amino. Advantageously, the silane is a primary or secondary aminosilane of the general formula:

$$X-R^1-Si(R^2)_x(OR^3)_{3-x}$$

wherein X is an active hydrogen-containing group that is reactive for isocyanate, e.g., —SH or —NHR$^4$ in which R$^4$ is H, a monovalent hydrocarbon group of up to 8 carbon atoms or —R$^5$—Si(R$^6$)$_y$(OR$^7$)$_{3-y}$, R$^1$ and R$^5$ each is the same or different divalent hydrocarbon group of up to 12 carbon atoms, optionally containing one or more heteroatoms, each R$^2$ and R$^6$ is the same or different monovalent hydrocarbon group of up to 8 carbon atoms, each R$^3$ and R$^7$ is the same or different alkyl group of up to 6 carbon atoms and x and y each, independently, is 0, 1 or 2.

Non-limiting examples of aminosilanes for use in the silylation procedure herein include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

For many applications such as use those for sealing and coating it is preferred that the PUR prepolymers be substantially fully silylated, i.e., all, or substantially all, of the isocyanate groups be reacted with silane to provide substantially fully silylated polyurethane polymer.

Silylation of hydroxyl-terminated PUR prepolymer can be accomplished by reacting the prepolymer with an isocyanatosilane, for example any of those identified above.

It is preferred that silylation of the foregoing hydroxyl-terminated polybutadiene-based PUR prepolymers be substantially complete, i.e., that essentially no hydroxyl groups be present following silylation, where the silylated resins are to be used for sealing and coating applications.

For details of the silylation of other hydroxyl-terminated olefins, reference may be made to U.S. Pat. No. 4,975,488, the entire contents of which are incorporated by reference herein.

5. Moisture-Curable Silylated Resins Obtained from the Silylation of Isocyanate-Terminated or Amine-Terminated Polyurethane and/or Polyurea Prepolymers Derived from Polyamines Isocyanate-terminated and amine-terminated polyurethane-polyurea (poly(urethane-urea) or polyurethaneurea) prepolymers contain one or more urethane linkages and one or more urea linkages in their polymer chains whereas isocyanate-terminated and amine-terminated polyureas contain predominantly, if not exclusively, urea linkages in their polymer chains. Both types of prepolymers are known in the art. Silylation of the isocyanate prepolymers can be carried out with isocyanate-reactive silanes and silylation of the amino-terminated prepolymers can be carried out with isocyanatosilanes much as described above in connection with the silylation of hydroxyl-terminated and isocyanate-terminated precursor resins.

6. Moisture-Curable Silylated Resins Obtained from the Hydrosilation of Resins Possessing Terminal Olefinic Unsaturation Moisture-curable silylated resin (a)(1) can be obtained by hydrosilating a polymer possessing terminal olefinic unsaturation with a hydridosilane (hydrosilane or hydrogensilane), e.g., as disclosed, inter alia, in aforementioned U.S. Pat. No. 4,975,488 and in U.S. Pat. Nos. 4,371,664; 4,334,036; 5,298,572; 5,986,014; 6,274,688; 6,420,492; 6,552,118; 7,153,911; 7,202,310; and 7,223,817, the entire contents of which are incorporated by reference herein.

Moisture-curable silylated resin (a)(1) can make up the entirety of the first part of the two-part composition herein but is preferably combined with one or more optional components (a)(2), e.g., plasticizer, particulate filler, etc., with the silylated resin being present in the mixture at a level of from 10 to 80, and preferably from 20 to 50, weight parts per 100 weight parts thereof

Optional Component(s) (a)(2) and (b)(4)

As indicated above, the first part of the two-part moisture-curable composition of the invention can additionally contain one or more optional components (a)(2) among which may be mentioned plasticizer, solvent, thixotropic agent, particulate material, moisture scavenger, isocyanate scavenger, crosslinker, adhesion promoter, U.V. stabilizer and antioxidant in known and conventional amounts. Similarly, the second part of the composition can also contain one or more optional components (b)(4) individual ones of which can be the same as, or different from, aforementioned optional components (a)(2). Thus, optional components (b)(4) include solvent, thixotropic agent, pH adjuster, U.V. stabilizer and antioxidant, also for use in known and conventional amounts.

Examples of plasticizers that are suitable for optional addition to the first part of the two-part moisture-curable composition herein and to its second part in lieu of, or in addition to, particulate material, include phthalates, dipropylene and diethylene glycol dibenzoates and mixtures thereof, epoxidized soybean oil, and the like. Dioctyl and diisodecylphthalate are commercially available under the trade names Jayflex DOP and JayFlex DIDP from Exxon Chemical. The dibenzoates are available as Benzoflex 9-88, Benzoflex 9-88SG, Benzoflex 50 and Benzoflex 400 from Velsicol Chemical Corporation. Epoxidized soybean oil is available from Houghton Chemical Corporation as Flexol EPO. Plasticizer can be present in the two-part moisture-curable composition herein at a level of from 0 to 50, and preferably from 5 to 15, weight parts per 100 weight parts of the total composition.

Useful solvents include aromatic and aliphatic esters and ketones ranging in amounts of from 0 to 20, and preferably from 0 to 5, weight parts per 100 weight parts of the total moisture-curable composition of the invention.

Illustrative of useful thixotropic agents are various castor waxes, fumed silica, treated clays and polyamides. These optional additives typically comprise from 0 to 10, and preferably from 0.1 to 2, weight parts per 100 weight parts of the total two-part composition herein. The thixotropes include those available as: Aerosil from Degussa, Cabo-Sil TS 720 from Cabot, Castorwax from CasChem, Thixatrol and Thixcin from Rheox, Crayvallac from Crayvalley Corp., and Dislon from King Industries. If the thixotrope is reactive with silane (e.g., silica), adjustments to the amount formulated may be needed to compensate therefor.

Typical particulate materials, e.g., fillers, that are suitable for optional addition to the first part of the two-part moisture-curable composition herein and to its second part in lieu of, or in addition to, plasticizer include fumed silica, precipitated silica and calcium carbonates. Treated calcium carbonates having particle sizes of from $0.07\mu$ to $4\mu$ are particularly useful and are available under several trade names: Ultra Pflex, Super Pflex, Hi Pflex from Specialty in Minerals; Winnofil SPM, SPT from Solvay; Hubercarb lat, Hubercarb 3Qt and Hubercarb W from Huber and Kotomite from ECC, Omyacarb FT and BLR-3 from Omya. Particulate materials such as any of the foregoing can be present in the two-part moisture-curable composition at a level of from 0 to 70, and preferably from 40 to 60, weight parts per 100 weight parts of the total composition.

Suitable moisture scavengers, crosslinkers and adhesion promoters can be selected from among any of the known and conventional silanes heretofore used in any of these roles. Preferred moisture scavenging silanes are the vinylsilanes, e.g., vinyltrimethoxysilane (Silquest* A-171 silane) and methyltrimethoxysilane (Silquest* A-1630 silane). Useful crosslinking silanes and adhesion-promoting silanes include gamma-glycidoxypropyltrimethoxysilane (Silquest* A-187 silane), gamma-aminopropyltrimethoxysilane (Silquest* A-1110 silane), N-beta-(aminoethyl)-gamma-aminopropyltrimethoxysilane (Silquest* A-1120 silane), bis-(gamma-trimethoxysilylpropyl)amine (Silquest* A-1170 silane), N-beta-(aminoethyl)-gamma-aminopropylmethyldimethoxysilane (Silquest* A-2120 silane) and tris-(gamma-trimethoxylsilyl)isocyanurate (Silquest A-Link™597 silane). These silanes are available under the indicated trade designations from Momentive Performance Materials. Typically, the first part of the two-part moisture-curable composition of the invention can contain from 0 to 7, and preferably from 1 to 5 weight parts of such silane(s) per 100 weight parts of said first part.

In the manufacture of moisture-curable silylated resin of (a)(1) by the reaction of hydroxyl-terminated resin with isocyanatosilane as described above, small amounts of isocyanate groups, and possibly hydroxyl groups, which might accompany the silylated resin could undergo reaction during the storage of the first part of the two-part composition herein and, depending on the extent of their reaction(s) which, for example, might include the further reaction of isocyanate with hydroxyl-terminated resin (if, following silylation, there is still hydroxyl present), reaction of isocyanate with the hydrogen of a urethane group to form allophanate, reaction of isocyanate with the hydrogen atom of a urea group to form biuret and reaction of hydroxyl-terminated resin with an alkoxysilyl group, could result in an increase in viscosity of the silylated resin to a level which makes application of the two-part composition quite difficult, and in the case of its manual application from a hand-operated cartridge, impractical if not impossible for individuals of average strength. To avoid or mitigate this problem, it can be advantageous to include in the first part formulation an isocyanate-reactive scavenging agent as disclosed in commonly assigned copending U.S. patent application Ser. No. 11/524,844, filed Sep. 21, 2006, the entire contents of which are incorporated by reference herein. As disclosed in this application, the isocyanate-reactive scavenging agent possesses at least one active hydrogen and will react with isocyanate at a rate greater than any of the undesired reactions that could cause a significant increase in the viscosity of the first part of the two-part composition herein. Suitable isocyanate-scavenging agents include methanol, ethanol, n-propanol, isopropanol, n-butanol, sec-butanol, tert-butanol, and mixtures thereof. These and similar isocyanate-scavenging agents can be incorporated in the first part formulation at a level of from 0.01 to 0.5 weight parts, and preferably from 0.02 to 0.2 weight parts, based on 100 parts by weight of moisture-curable silylated resin (a)(1).

Known and conventional U.V. stabilizers and/or antioxidants can be incorporated in the first part of the two-art composition herein at the usual levels, e.g., from 0 to 10, and preferably from 0 to 4, weight parts per 100 weight parts of said first part. Suitable materials of this type are available from Ciba-Geigy under the trade names Tinuvin 770, Tinuvin 327, Tinuvin 213, Tinuvin 622 and Irganox 1010.

II. The Second Part of the Two-Part Moisture-Curable Resin Composition

Water (b)(1)

Any industrially suitable source of water can be used to provide the water component of the two-part moisture-curable resin composition herein provided it does not contain any appreciable amount of dissolved and/or insoluble material that would negatively affect the properties of the cured resin resulting from the admixture of the two parts. Deionized water is generally useful for most formulations.

The amount of water contained in the second part is largely determined by the amount and nature of the moisture-curable silylated resin (a)(1) contained in the first part. In general, the amounts of water in the second part can range from 0.1 to 40, and preferably from 1 to 20, weight parts per 100 weight parts of the second part of the two-part composition of the invention.

Plasticizer and/or Particulate Material (b)(2)

The second part of the two-part composition contains a suitable amount of plasticizer, particulate material, e.g., filler, reinforcing fiber, etc., or both, either the same or different from that of any of the plasticizers and particulates identified above, as optional components of the first part. The particular amounts of plasticizer and/or particulate materials chosen for a two-part composition in accordance with the invention will depend on such factors as the rheological properties of the first part, the presence, if any of plasticizer(s) and particulate material(s) in the first part, the desired rheological properties for the second part, and similar considerations. In general, the second part of the two-part composition can contain from 0 to 80, and preferably from 20 to 60, weight parts of parts of plasticizer and/or from 0 to 60, and preferably from 30 to 50, weight parts of particulate material, per 100 weight parts thereof Non-Ionic Surfactant (b)(3)

It is essential to maintaining the storage stability of the second part of the two-part composition of the invention that it contain a sufficient amount of at least one non-ionic surfactant as will prevent any significant or discernible separation of plasticizer or particulate material (b)(2) and/or optional component(s)(b)(3), infra, from water (b)(1). Suitable non-ionic surfactants for inclusion in the second part include polyethylene glycols, polypropylene glycols, ethoxylated castor oil, oleic acid ethoxylates, alkylphenol ethoxylates, copolymers of ethylene oxide (EO) and propylene oxide (PO) and, preferably, copolymers of silicones and polyethers, e.g., polyethers derived from ethylene oxide, propylene oxide and mixtures thereof. The use of silicone polyethers as non-ionic surfactants is described in U.S. Pat. No. 5,744,703, the entire contents of which are incorporated by reference herein. Non-ionic surfactant (b)(3) will be utilized in an amount sufficient to maintain the desired period of storage stability of the second part, suitable amounts being affected by such factors as the amount of water, plasticizer(s), particulate material(s) and optional component(s) making up the second part. Optimum amounts of non-ionic surfactant for a particular second part formulation can be readily determined employing routine experimental methods. In general, the second part can contain from 0.1 to 40, and preferably from 1 to 30, weight parts of non-ionic surfactant (b)(3) per 100 weight parts thereof.

Catalyst (c)

At least one of the parts of the two-part composition herein contains a catalyst (c) for the condensation reaction of hydrolyzed moisture-curable silylated resin (a)(1). Ordinarily, catalyst (c) will be incorporated in the first part of the two-part composition. However, if it is hydrolytically stable, catalyst (c) or some portion thereof may be incorporated in the second part although there is generally no technical advantage to doing so.

Catalyst (c) can be any of those compounds known to be useful for accelerating crosslinking in moisture-curable adhesives, sealants, and coatings. The catalyst can include metal and non-metal compounds. Examples of the metal condensation cure catalysts useful in the present invention include tin, titanium, zirconium, lead, iron, cobalt, antimony, manganese, bismuth, and zinc compounds. The tin compounds useful for facilitating crosslinking 2-part silylated polyurethane compositions, of the present invention, include: non-chelated tin compounds such as dibutyltin dilaurate, dibutyltin diacetate, dibutyltin dimethoxide, dimethyltin di-neodecanoate, tin octoate, and dibutyltinoxide. In another embodiment, diorgano-tin bis B-diketonates are used. A preferred diorganotin bis B-diketonate is dibutyltin bis-acetylacetonate. Other examples of tin compounds may be found in U.S. Pat. Nos. 5,213,899, 4,554,338, 4,956,436, and 5,489,479, the entire contents of which are incorporated by reference herein. In yet another embodiment, chelated titanium compounds, for example, 1,3-propanedioxytitanium bis(ethylacetoacetate); di-isopropoxytitanium bis(ethylacetoacetate); and tetra-alkyl titanates, for example tetra n-butyltitanate and tetra-isopropyltitanate, are used. It is preferred that the condensation catalyst of the present invention is a metal catalyst. The preferred metal condensation catalyst is advantageously selected from the group consisting of tin compounds with dibutyltin dilaurate and "chelated" dibutyltin oxide (Fomrez™ SUL 11A) being preferred.

Other Optional Components (d)

Either or both parts of the two-part composition herein can contain one or more optional components other than those indicated above provided, of course, a particular optional component is fully compatible for the part(s) in which it is to be incorporated. These other optional components (d) include other resins, e.g., curable resins such as epoxy resins, acrylates and methacrylate resins, polyurethanes, silanol-terminated polydiorganosiloxanes, etc., cure catalysts for such resins, defoamers, viscosity controllers, fragrances, pigments, colorants, biocides, biostats, fragrances, etc., in known and conventional amounts.

The moisture-curable silylated resin composition of this invention can be formulated for use as an adhesive, sealant, coating, gasket, industrial rubber product, and the like. For formulation in sealant compositions, the silylated resin compositions of the present invention are combined with fillers and additives known in the prior art for use in elastomeric compositions. By the addition of such materials, particular physical properties such as viscosity, flow rate, sag, and the like, can be achieved.

The first part of the two-part composition of the present invention can be prepared, e.g., by thoroughly mixing together the moisture-curable silylated resin, optional component(s) such as plasticizer, particulate material, etc., and/or catalyst in either a batch or continuous mode of manufacture.

In a batch process, the components of the first part of the two-part composition can be substantially uniformly combined using a double planetary mixer with high-speed disperser, a twin-screw extruder, and/or a Hauschild Speed-Mixer™. Typically, the moisture-curable silylated resin and optional component(s) are substantially uniformly mixed at between 60° C. and 90° C. for 60 to 90 minutes. After cooling to below 50° C., silane adhesion promoter, crosslinker, and cure catalyst may be added and the composition mixed for an additional 10 minutes to 60 minutes under a dry nitrogen atmosphere. The composition is then vacuum de-gassed for approximately 5 minutes to 60 minutes and thereafter packaged to complete the first part. In a similar fashion, water, plasticizer, particulate material, non-ionic surfactant and optional component(s) water are mixed together at between 20° C. and 70° C. for approximately 10 minutes to 60 minutes. The composition is then vacuum de-gassed for 5 minutes to 60 minutes and packaged to complete the second part.

In a continuous manufacturing process, all of the ingredients constituting a part can be mixed in a continuous compounding extruder to produce the desired compositions of the present invention. The continuous compounding extruder can be any continuous compounding extruder such as the twin screw Werner-Pfleiderer/Coperion extruder, a Buss or a P.B. Kokneader extruder. In such a continuous process, the extruder is typically operated at a temperature of from 50° to 100° C. and more preferably, from 60° to 80° C., preferably under a vacuum so as to remove volatiles that may be produced during the mixing operation.

The examples below are provided for the purposes of illustrating the present invention. All parts and/or percentages in the examples are parts by weight (pbw). In all examples, a continuous compounding extruder was utilized in the manufacture of the two-part moisture-curable silylated resin compositions. The continuous extruder was a 30 mm Coperian (formerly Werner-Pfleiderer Twin-Screw extruder. The resulting two-component, moisture-curable silylated resin compositions exhibit excellent shelf-stability, fast curing and excellent self-bonding characteristics. In all examples, the two-part compositions were mixed using a mix ratio of 10-volume % first part to 1 volume % second part. The 10:1 mix ratio was effected using a pneumatic 10:1 by volume tandem cartridge applicator gun fitted with a static mixer (MixPac™ model DP 200-70, ConProTec Inc.).

Each of the first and second parts were tested for stability by measuring the viscosity of the compositions before, during and after a six month storage period at 50° C. The compositions were packaged in a sealed aluminum can and placed in a 50° C. oven. Viscosities were measured at one month intervals. The compositions were also tested for modulus at 50% elongation per ASTM D-412, Durometer per ASTM C-661, tensile adhesion per ASTM C-1135, and lap shear adhesion per ASTM C-961. All adhesion testing was done on unprimed PVC substrate that was cleaned with soap and water and dried before applying the adhesive. All adhesion and physical property testing was done on an Instron Model 4465 testing machine.

Example 1

A. Preparation of the First Part of the Two-Part Composition

There was continuously fed into barrel 1 of the extruder 30.6 pbw SPUR™ 1015 resin (Momentive Performance Materials), 15.4 pbw UltraPflex treated precipitated calcium carbonate (Specialty Minerals Corp.), 41.6 pbw Hi-Pflex 100 treated ground calcium carbonate (Specialty Minerals Corp.) and 1.1 pbw Crayvallac SLX polyamide thixotrope (Crayvalley Corp). Further downstream, on the extruder, there was continuously added 9.3 pbw diisodecylphthalate, 1 pbw vinyltrimethoxysilane (Silquest* A-171 silane) moisture scavenger, 1 pbw N-beta-(aminoethyl)-gamma-aminopropyltrimethoxysilane (Silquest A-1120 silane) adhesion promoter, and 0.07 pbw dibutyltin dilaurate condensation cure catalyst. The processing temperature of the extruder was maintained at 80° C. and the production rate was 40 lb/hr. A de-gassing vacuum (25 inches Hg) was applied at barrel 10 of the extruder. The finished first part formulation was extruded directly to a high-density polyethylene Semco™ cartridge (available from PRC-DeSoto) and sealed.

B. Preparation of the Second Part of the Two-Part Composition

There was continuously fed into barrel 1 of the extruder 40 pbw diisodecylphthalate, 20 pbw UltraPflex treated precipitated calcium carbonate (Specialty Minerals Corp.), and 20 pbw titanium dioxide powder. Further downstream, on the extruder, there was continuously added 20 pbw of a pre-blend comprised of 50 pbw SF1288 silicone polyether surfactant and 50 pbw water. The processing temperature of the extruder was maintained at 80° C. and the production rate was 40 lb/hr. A de-gassing vacuum (25 inches Hg) was applied at barrel 10 of the extruder. The finished second part formulation was extruded directly to a high-density polyethylene Semco™ cartridge and sealed. 50° C. stability testing results are presented in Table 1, infra.

C. The Combined Two-Part Composition

Using the MixPac duel chamber gun, the first part was mixed with the second part in a 10:1 by volume mix ratio. Modulus, durometer, tensile adhesion and lap shear adhesion test results are presented in Tables 2-6, infra.

Example 2

Example 1 was repeated but using 0.13 pbw dibutyltin dilaurate condensation cure catalyst for the preparation of the first part. 50° C. stability test results for the second part are presented in Table 1, infra. Modulus, durometer, tensile adhesion and lap shear adhesion test results are presented in Tables 2-6, infra.

Example 3

Example 1 was repeated but using 0.23 pbw dibutyltin dilaurate condensation cure catalyst for the preparation of the first part. 50° C. stability testing results for the second part are presented in Table 1, infra. Modulus, durometer, tensile adhesion and lap shear adhesion test results are presented in Tables 2-6, infra.

Example 4

Example 1 was repeated but using 0.07 pbw Fomrez™ SUL 11-A (Chemtura) condensation cure catalyst for the preparation of the first part. 50° C. stability testing results for the second part are presented in Table 1, infra. Modulus, durometer, tensile adhesion and lap shear adhesion test results are presented in Tables 2-6, infra.

Example 5

Example 2 was repeated but using 0.13 pbw Fomrez™ SUL 11-A condensation cure catalyst for the preparation of the first part. 50° C. stability testing results for the second part are presented in Table 1, infra. Modulus, durometer, tensile adhesion and lap shear adhesion test results are presented in Tables 2-6, infra.

Example 6

Example 2 was repeated but using 0.23 pbw Fomrez™ SUL 11-A condensation cure catalyst for the preparation of the first part. 50° C. stability testing results for the second part are presented in Table 1, infra. Modulus, durometer, tensile adhesion and lap shear adhesion test results are presented in Tables 2-6, infra.

Comparative Example 1

This example demonstrates the continuous production of a one-part silylated polyurethane adhesive using 0.07 pbw dibutyltin dilaurate shelf stability in modulus, durometer, tensile adhesion and lap shear adhesion results are reported in Tables 1-6, infra.

Comparative Example 2

This example demonstrates the continuous production of the second part of a two-part SPUR™ adhesive composition which contains a portion of the SPUR resin.

There was continuously fed into barrel 1 of the extruder 5 pbw SPUR™ 1015 resin, 35 pbw diisodecylphthalate, 20 pbw UltraPflex treated precipitated calcium carbonate (Specialty Minerals Corp.), and 20 pbw titanium dioxide powder. Further downstream of the extruder, there was continuously added 20 pbw of a pre-blend comprised of 50 pbw SF1288 silicone polyether surfactant and 50 pbw water. The processing temperature of the extruder was maintained at 80 deg. C. and the production rate was 40 lb/hr. A de-gassing vacuum (25 inches Hg) was applied at barrel 10 of the extruder. The finished second part formulation was extruded directly to a high-density polyethylene Semco™ cartridge and sealed. 50° C. stability testing results are presented in Table 1 below

TABLE 1

50° C. Accelerated Shelf Age Stability Study
Room Temperature Viscosity, cps

| | Ex. 1(A) | Ex. (B) | Ex. 2 | Ex. 3 | Ex. 4 | Ex. 5 | Ex. 6 | Comp. Ex. 2 |
|---|---|---|---|---|---|---|---|---|
| Initial Viscosity | 498,000 | 179,000 | 503,000 | 492,000 | 510,000 | 499,000 | 491,000 | 182,000 |
| Viscosity After 1 Month at 50° C. | 496,000 | 181,000 | 501,000 | 493,000 | 512,000 | 499,000 | 493,000 | gelled |
| Viscosity After 2 Months at 50° C. | 501,000 | 178,000 | 503,000 | 493,000 | 512,000 | 497,000 | 495,000 | |
| Viscosity After 3 Months at 50° C. | 501,000 | 177,000 | 505,000 | 496,000 | 509,000 | 499,000 | 494,000 | |
| Viscosity After 4 Months at 50° C. | 502,000 | 178,000 | 503,000 | 495,000 | 513,000 | 501,000 | 493,000 | |
| Viscosity After 5 Months at 50° C. | 502,000 | 181,000 | 505,000 | 497,000 | 513,000 | 502,000 | 495,000 | |
| Viscosity After 6 Months at 50° C. | 502,000 | 180,000 | 505,000 | 496,000 | 512,000 | 501,000 | 495,000 | |

*Viscosity measurements obtained with Brookfield HBT Heliopath, Spindle TC at 5 rpm As the stability data in Table 1 show, shelf life (package) stability is obtained only when hydrolysable SPUR resin and silanes do not come in contact with moisture.

TABLE 2

ASTM D-412 Modulus at 50% Elongation vs. Cure Time
ASTM D-412 Modulus at 50% Elongation, psi

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 1 | 0 | 19 | 26 | 0 | 23 | 29 | 0 |
| 2 | 12 | 28 | 41 | 20 | 35 | 39 | 0 |
| 4 | 22 | 46 | 40 | 28 | 50 | 55 | 0 |
| 6 | 39 | 45 | 51 | 41 | 53 | 59 | 0 |
| 8 | 39 | 57 | 54 | 43 | 55 | 68 | 0 |
| 24 | 71 | 62 | 60 | 67 | 67 | 69 | 14 |

TABLE 2-continued

ASTM D-412 Modulus at 50% Elongation vs. Cure Time
ASTM D-412 Modulus at 50% Elongation, psi

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 48 | 76 | 70 | 63 | 72 | 65 | 72 | 38 |
| 168 | 68 | 65 | 66 | 74 | 71 | 71 | 68 |

TABLE 3

ASTM C-661 Durometer, Shore A vs. Cure Time
ASTM C-661 Durometer, Shore A

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 1 | 0 | 8 | 12 | 0 | 10 | 15 | 0 |
| 2 | 4 | 13 | 20 | 7 | 20 | 24 | 0 |
| 4 | 13 | 21 | 21 | 15 | 23 | 29 | 0 |
| 6 | 17 | 22 | 26 | 20 | 24 | 29 | 0 |
| 8 | 22 | 23 | 28 | 21 | 27 | 31 | 0 |
| 24 | 34 | 29 | 29 | 31 | 31 | 31 | 12 |
| 48 | 35 | 33 | 30 | 33 | 31 | 33 | 21 |
| 168 | 33 | 32 | 30 | 31 | 32 | 32 | 33 |

*Durometer, Shore A measurements taken with Exacta ™ Hardness Tester from New Age Industries

TABLE 4

ASTM C-1135 Tensile Adhesion vs. Cure Time
ASTM C-1135 Tensile at Break, psi

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 0.5 | 0 | 17 | 39 | 0 | 18 | 45 | 0 |
| 1 | 0 | 37 | 67 | 8 | 47 | 54 | 0 |
| 2 | 24 | 51 | 75 | 35 | 66 | 68 | 0 |
| 3 | 41 | 81 | 104 | 50 | 89 | 92 | 0 |
| 4 | 48 | 82 | 97 | 63 | 88 | 103 | 0 |
| 5 | 65 | 88 | 101 | 72 | 100 | 101 | 0 |
| 6 | 51 | 98 | 98 | 65 | 99 | 106 | 0 |
| 7 | 70 | 101 | 108 | 75 | 99 | 107 | 0 |
| 8 | 68 | 94 | 104 | 76 | 107 | 109 | 0 |

TABLE 4-continued

ASTM C-1135 Tensile Adhesion vs. Cure Time
ASTM C-1135 Tensile at Break, psi

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 24 | 90 | 105 | 109 | 92 | 103 | 107 | 0 |
| 48 | 91 | 107 | 103 | 86 | 97 | 106 | 0 |

TABLE 5

ASTM C-1135 Tensile Adhesion vs. Cure Time
ASTM C-1135% Cohesive Failure

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 0.5 | 0 | 0 | 0 | 0 | 0 | 0 | 0 |
| 1 | 0 | 0 | 0 | 0 | 0 | 0 | 0 |
| 2 | 0 | 0 | 0 | 0 | 0 | 0 | 0 |
| 3 | 0 | 0 | 10 | 0 | 0 | 20 | 0 |
| 4 | 0 | 80 | 80 | 0 | 0 | 60 | 0 |
| 5 | 0 | 80 | 90 | 0 | 0 | 75 | 0 |
| 6 | 15 | 90 | 90 | 0 | 75 | 95 | 0 |
| 7 | 15 | 90 | 85 | 0 | 95 | 100 | 0 |
| 8 | 20 | 95 | 95 | 30 | 90 | 100 | 0 |
| 24 | 95 | 100 | 100 | 100 | 95 | 95 | 0 |
| 48 | 95 | 100 | 100 | 95 | 95 | 100 | 0 |

TABLE 6

ASTM C961: Lap Shear Adhesion vs. Cure Time
ASTM C-961 Lap Shear Adhesive Strength, psi

| Cure Time, Hr | Ex. 1(C) | Ex. 2 | Ex. 3 | Ex. 4 | Ex. 5 | Ex. 6 | Comp. Ex. 1 |
|---|---|---|---|---|---|---|---|
| 0.5 | 0 | 16 | 36 | 0 | 31 | 39 | 0 |
| 1 | 21 | 35 | 78 | 12 | 64 | 82 | 0 |
| 1.5 | 37 | 68 | 103 | 22 | 81 | 112 | 0 |
| 2 | 47 | 72 | 98 | 39 | 89 | 113 | 0 |
| 3 | 71 | 92 | 117 | 60 | 103 | 118 | 0 |
| 4 | 71 | 95 | 111 | 72 | 110 | 117 | 0 |
| 5 | 91 | 98 | 95 | 83 | 108 | 119 | 0 |
| 6 | 98 | 98 | 110 | 88 | 107 | 121 | 0 |
| 7 | 95 | 99 | 110 | 92 | 112 | 119 | 0 |
| 8 | 95 | 112 | 95 | 88 | 112 | 123 | 0 |
| 24 | 95 | 118 | 102 | 110 | 118 | 120 | 0 |
| 48 | 119 | 105 | 102 | 115 | 117 | 121 | 38 |

As the data in Tables 2-6 show, the cure rates of two-part formulations are significantly faster than that of equivalent 1-part formulations.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. A two-part moisture-curable resin composition which comprises:
    a) a first part substantially free of moisture comprising:
       (1) moisture-curable silylated resin obtained by the silylation of at least one resin selected from the group consisting of polyether polyol (i), polyester polyol (ii), hydroxyl-terminated polybutadiene (iii), hydroxyl terminated or isocyanate-terminated polyurethane prepolymer (iv) derived from at least one of polyether polyol (i), polyester polyol (ii) or hydroxy-terminated polybutadiene (iii), amine-terminated or isocyanate-terminated polyurethane-polyurea prepolymer and/or polyurea prepolymer (v) derived from polyamine, and olefinically unsaturated resin (vi); and,
       (2) optionally, one or more additional components selected from the group consisting of plasticizer, solvent, thixotropic agent, particulate material, moisture scavenger, isocyanate scavenger, crosslinker, adhesion promoter, U.V. stabilizer and antioxidant; and,
    b) a second part comprising:
       (1) water in an amount sufficient to cure moisture-curable silylated resin (a)(1);
       (2) at least one plasticizer and/or particulate material,
       (3) nonionic surfactant (b)(3) in an amount sufficient to provide a stable emulsion of plasticizer (b)(2), if present, and a stable suspension of particulate material (b)(2), if present, wherein non-ionic surfactant (b)(3) is selected from the group consisting of polyethylene glycol, polypropylene glycol, copolymer of ethylene oxide and propylene oxide, ethoxylated castor oil, oleic acid ethoxylate, alkylphenol ethoxylate, copolymer of silicone and polyether and mixtures of the foregoing; and
       (4) optionally, one or more additional components selected from the group consisting of solvent, thixotropic agent, pH adjuster, U.V. stabilizer and antioxidant, provided, the first part and/or the second part further comprises catalyst (c) for the condensation reaction of hydrolyzed moisture-curable silylated resin (a)(1).

2. The two-part moisture-curable resin composition of claim 1 wherein moisture-curable silylated resin (a)(1) is obtained from at least one of polyether polyol (i), polyester polyol (ii), hydroxyl-terminated polybutadiene (iii), hydroxyl-terminated polyurethane prepolymer (iv) or amine-terminated polyurethane-polyurea prepolymer and/or amine-terminated polyurea prepolymer (v) by silylation with at least one isocyanatosilane, or from isocyanate-terminated polyurethane prepolymer (iv) or isocyanate-terminated polyurethane-polyurea prepolymer and/or isocyanate-terminated polyurea prepolymer (v) by silylation with at least one isocyanate-reactive silane selected from the group consisting of mercaptosilane, primary aminosilane, secondary aminosilane and mixtures thereof, or from olefinically unsaturated resin (vi) by hydrosilation with at least one hydridosilane.

3. The two-part moisture-curable resin composition of claim 2 formulated as an adhesive, sealant or coating.

4. The two-part moisture-curable resin composition of claim 1 wherein moisture-curable silylated resin (a)(1) is at least one silylated polyurethane prepolymer obtained from the silylation of hydroxyl-terminated or isocyanate-terminated polyurethane prepolymer (iv) derived from polyether dial (i) and diisocyanate.

5. The two-part moisture-curable resin composition of claim 4 wherein silylation of hydroxyl-terminated polyurethane prepolymer (iv) is carried out with at least one isocyanatosilane and silylation of isocyanate-terminated polyurethane prepolymer (iv) is carried out with at least one isocyanate-reactive silane selected from the group consisting of mercaptosilane, primary aminosilane, secondary aminosilane and mixtures thereof.

6. The two-part moisture-curable resin composition of claim 4 formulated as an adhesive, sealant or coating.

7. The two-part moisture-curable resin composition of claim 1 wherein first part (a) contains one or more additional components (a)(2).

8. The two-part moisture-curable resin composition of claim 7 wherein non-ionic surfactant (b)(3) is selected from the group consisting of polyethylene glycol, polypropylene glycol, copolymer of ethylene oxide and propylene oxide, ethoxylated castor oil, oleic acid ethoxylate, alkylphenol ethoxylate, copolymer of silicone and polyether and mixtures of the foregoing.

9. The two-part moisture-curable resin composition of claim 8 formulated as an adhesive, sealant or coating.

10. The two-part moisture-curable resin composition of claim 7 formulated as an adhesive, sealant or coating.

11. The two-part moisture-curable resin composition of claim 1 wherein second part (b) contains plasticizer (b)(2) and particulate material (b)(2), nonionic surfactant (b)(3) being present in second part (b) in an amount sufficient to provide a stable emulsion of plasticizer (b)(2) and a stable suspension of particulate material (b)(2).

12. The two-part moisture-curable resin composition of claim 11 wherein non-ionic surfactant (b)(3) is selected from the group consisting of polyethylene glycol, polypropylene glycol, copolymer of ethylene oxide and propylene oxide, ethoxylated castor oil, oleic acid ethoxylate, alkylphenol ethoxylate, copolymer of silicone and polyether and mixtures of the foregoing.

13. The two-part moisture-curable resin composition of claim 12 formulated as an adhesive, sealant or coating.

14. The two-part moisture-curable resin composition of claim 11 formulated as an adhesive, sealant or coating.

15. The two-part moisture-curable resin composition of claim 1 formulated as an adhesive, sealant or coating.

* * * * *